United States Patent [19]

Lin et al.

[11] Patent Number: 4,687,816

[45] Date of Patent: Aug. 18, 1987

[54] SURFACE TREATMENT OF SOFT CONTACT LENSES

[75] Inventors: Shaow B. Lin, Phoenix; Lyle M. Bowman, Scottsdale; S. Kumar Chandrasekaran, Paradise Valley; Thomas B. Harvey, III, Scottsdale, all of Ariz.

[73] Assignee: Sola U.S.A. Inc., Phoenix, Ariz.

[21] Appl. No.: 765,886

[22] Filed: Aug. 14, 1985

[51] Int. Cl.$^4$ ............................................... C08F 8/32
[52] U.S. Cl. .................................... 525/279; 523/106; 525/328.8; 525/379; 525/386
[58] Field of Search ...................... 525/386, 279, 379; 523/106

[56] References Cited

U.S. PATENT DOCUMENTS

| | | | |
|---|---|---|---|
| T102,101 | 8/1982 | Drake et al. ......................... | 525/386 |
| 4,379,893 | 4/1983 | O'Malley et al. .................... | 525/386 |
| 4,546,123 | 10/1985 | Schafer et al. ...................... | 525/376 |
| 4,569,858 | 2/1986 | Lim et al. ............................ | 427/164 |

Primary Examiner—Joseph L. Schofer
Assistant Examiner—Bernard Lipman
Attorney, Agent, or Firm—Charles E. Cates; David A. Lowin

[57] ABSTRACT

A process for the treatment of a soft contact lens, to increase its resistance to the deposition thereon and diffusion and accumulation therein of substances which will promote its clouding and discoloration in use, and to improve its mechanical strength, includes treating a hydroxyl group-containing acrylic ester soft contact lens or replica with an organic acid anhydride for a sufficient period of time to treat at least a portion of polymer molecules on the outer surfaces, e.g. by esterifying hydroxyl groups on the molecules and facilitating extraction of organic-type impurities. The process is optionally performed in the presence of a medium which partially swells the surface regions of the lens or replica prior to or during the process.

16 Claims, No Drawings

SURFACE TREATMENT OF SOFT CONTACT LENSES

BACKGROUND OF THE INVENTION

1. Field of the Invention

This invention relates to hydrophilic plastic materials useful as soft contact lenses, and more particularly relates to treatment of soft hydrophilic contact lenses to make them more resistant to protein deposition and diffusion in use, and to improve their mechanical strength.

2. Background Information

It has long been known to fabricate contact lenses from rigid materials such as glass and clear plastics, e.g. essentially hydrophobic acrylic-type polymers such as polymethyl methacrylate and the like. Although more safely handled and used than glass, such hydrophobic plastic materials have been only moderately successful as contact lenses, being too hard and uncomfortable to the wearer. More recently, contact lens compositions have been developed from hydrophilic-type polymers which are softer and generally more easily accomodated by the eye. Thus, the use of hydrophilic polymer lens compositions is becoming of increasing importance in ophthalmological practice.

Hydrophilic polymers useful as soft contact lenses typically are lightly cross-linked copolymers derived from one or more hydroxyl group-containing monomers. In their hydrated state, these polymers are known generally in the art as "hydrogels", and in their dry state as "xerogels". A xerogel in the shape of a contact lens is referred to as a "replica". These gels can be defined as coherent, three-dimensional polymer structures or networks which have the ability to absorb or imbibe large quantities of water without dissolution therein. At the present time, the specific class of polymer hydrogels which have gained particular commercial acceptance as soft contact lenses are those derived from acrylic esters. U.S. Pat. Nos. 2,976,576 and 3,220,960, issued to Wichterle and Lim, are early patents which describe the use of acrylic ester hydrogels for the manufacture of soft contact lenses. Many subsequent patents, as well as technical articles, are directed to the preparation of numerous other acrylic ester-type hydrogels which differ primarily in the type and/or percentage of comonomers contained therein. Examples of such later patents include U.S. Pat. Nos. 3,361,858; 3,542,097; 3,647,736; 3,700,761; 3,728,315; 3,926,892; 4,045,547; 4,056,496; 4,095,877; 4,109,070; and 4,113,686.

In the main, acrylic ester hydrogels are all derived by copolymerizing a major amount of a water-soluble monoester of acrylic or methacrylic acid in which the ester moiety contains at least one hydrophilic group and a minor amount of a bifunctional diester of acrylic or methacrylic acid which crosslinks the hydrophilic group-containing monomer as it polymerizes.

Although presently used contact lenses fabricated from polymer hydrogels are much softer than the prior hard contact lenses and can be accomodated by the wearer with relatively little discomfort, they nevertheless have some disadvantageous properties and have not been completely satisfactory. Hydrogel lenses favor the growth of pathogenic bacteria and fungi on their surfaces and in their pores. If the lenses are not regularly cleaned and sterilized, or if they are stored in contaminated solutions, the pathogens can be easily sorbed by the lens material due to its flexible, hydrophilic polymer structure. Corneal-damaging chemical residues from improper cleaning and/or sterilization techniques may likewise be introduced into the lens material in this way. Also, because of this flexible, hydrophilic polymer structure, proteins and other normal substances in the eye environment can be easily deposited on and/or diffused through a lens with use. Further, these lenses are mechanically much weaker than hard lenses, and are subject to damage such as tearing, especially when hydrated.

U.S. Pat. No. 3,895,169 to Wichterle discloses a method of forming a hydrophilic layer on an acrylate resin which comprises partially hydrolyzing and re-esterifying the surface with a mixture of a strong acid and a polyhydroxy compound, e.g. sulfuric acid and ethylene glycol.

U.S. Pat. Nos. 4,097,657 and 4,128,318 to Sieglaff et al. disclose the treatment of soft contact lenses with a range of compounds including aliphatic dithiols and aliphatic amines (the '657 patent) and aliphatic aminoalcohols (the '318 patent). The lenses in these patents are apparently treated in the hydrogel (hydrated) rather than in the xerogel (unhydrated) state. The treatment is stated to increase the resistance of the lenses to clouding and discoloration.

U.S. Pat. No. 4,214,014 to Höfer et al. discloses a method for surface treating hard lenses or dry soft contact lenses by a gas plasma discharge, preferably in an oxygen atmosphere, which is stated to reduce the deposition of proteins, etc. on the lens.

U.S. Pat. No. 4,379,893 to O'Malley et al. discloses a method for surface treating soft contact lenses, especially those containing 2-hydroxyethyl methacrylate (HEMA), by reacting the lens with a methyl or ethyl ester of an alkylene dicarboxylic acid, such as diethyl succinate, which is stated to reduce the deposition of proteins, etc. on the lens. U.S. Defensive Publication No. T102,101 to Drake et al. discloses treating lenses with an aqueous solution of an alpha-amino acid, aliphatic dicarboxylic acid, or aromatic dicarboxylic or tricarboxylic acid, etc., to produce a modified, less hydrophilic structure.

British Pat. No. 1,401,233 to Ceskoslovenska Akademie Ved (Wichterle) discloses a method for surface treating HEMA articles, such as contact lenses, by reacting the article with a sulfonating or phosphorylating agent, which is stated to increase the hydrophilicity of the surface. Swelling of the material of the article is disclosed, as is the impregnation, prior to the surface treatment, of the article with a tertiary amine, such as pyridine.

It would be desirable to develop a process for the treatment of soft contact lenses, especially in their dry or xerogel state, which significantly inhibits protein and lipid deposition and diffusion in use and improves the mechanical strength of the lens, while still allowing for comfortable wear in the hydrogel state.

In a first aspect, the present invention provides a process for treating soft contact lenses to inhibit protein and lipid deposition thereon.

Another aspect of the present invention is to provide a process for treating soft contact lenses to improve the extraction of organic-type impurities therefrom.

Still another aspect of the present invention is to provide a process for improving the mechanical strength of a soft contact lens, while still remaining comfortable to wear when hydrated.

Yet another aspect of the invention is to provide a soft contact lens which is resistant to the deposition of protein and lipids.

SUMMARY OF THE INVENTION

The present invention provides a process for the treatment of a soft contact lens, to increase its resistance to the deposition thereon and diffusion and accumulation therein of substances which will promote its clouding and discoloration in use, to facilitate the extraction of organic-type impurities from the lens, and to improve its mechanical strength. The process includes treating a hydroxyl group-containing acrylic ester soft contact lens or replica with an organic acid anhydride for a sufficient period of time to treat at least a portion of polymer molecules on the lens' outer surfaces, e.g. extracting any organic-type impurities and by esterifying hydroxyl groups on the molecules.

The process is optionally performed in the presence of a medium which partially swells the surface regions of the lens or replica prior to or during the process.

DETAILED DESCRIPTION OF THE INVENTION

In general, any polymer which contains a hydroxyl group capable of reacting with an appropriate functional group of the organic acid anhydride, as defined hereinafter, may be successfully treated in accordance with this invention. Since the acrylic polymers which contain hydroxyl ester groups currently enjoy the most widespread commercial acceptance, accordingly, in the description of the invention which follows, specific reference will be made to such acrylic esters.

The preparation of acrylic ester hydrophilic polymers by copolymerizing, for example, 2-hydroxyethyl methacrylate (HEMA) and ethylene glycol dimethacrylate (EGDMA) has long been known, being described in the aforementioned U.S. Pat. Nos. 2,976,576 and 3,220,960. The later patents directed to various modifications of the foregoing basic copolymers include, among others, copolymers of the hydroxyalkyl methacrylates with vinyl pyrrolidone as described, for example, in a series of U.S. patents beginning with U.S. Pat. No. 3,503,393 to Seiderman. The polymers preferably comprise a major proportion of HEMA, glyceryl methacrylate (GMA), or mixtures thereof, with a minor proportion of methyl methacrylate (MMA), diesters such as EGDMA, vinyl pyrrolidone, or other monomers. N-methyl pyrrolidone or similar plasticisers may also be present, and the polymer may also contain a polymerization catalyst of any suitable type. It is to be understood, however, that while many hydrophilic polymers adapted for the preparation of soft contact lenses contain suitable hydroxyl groups and thus may be successfully treated in accordance with this invention, neither these hydrophilic polymers per se, nor their preparation and/or fabrication into lenses constitute a part of this invention.

To effect the desired treatment of the polymer, an reagent comprising an organic acid anhydride is used. Suitable such anhydrides preferably contain no other functional group, and preferably are those where the organic (non-carboxyl) moiety is $C_1$-$C_8$ alkyl (including cycloalkyl), halogen-substituted $C_1$-$C_8$ alkyl, or syloxy-substituted $C_1$-$C_8$ alkyl. Presently particularly preferred compounds include acetic anhydride, trimethylacetic anhydride (pivalic anhydride), and trifluoroacetic anhydride.

The treatment preferably takes place in the presence of a mild base such as pyridine, tertiary amines such as trimethylamine or triethylamine, N,N-dimethyl-4-aminopyridine, or 4-pyrrolidylpyridine.

The treatment is preferably carried out in the presence of a suitable medium for the anhydride. By a "suitable medium" is meant a medium which forms a solution with the anhydride and the base (if present), and which does not adversely affect the lens material. Typical suitable media are aprotic solvents such as aliphatic or aromatic hydrocarbons (e.g. benzene or toluene) and halogenated hydrocarbons (e.g. $CCl_4$ or $CHCl_3$). The medium should not cause significant swelling (solvation) of the lens or replica structure, as this could lead to reaction throughout the material. For example, water is not a suitable medium. Other highly polar or protic liquids, such as alcohols, are unlikely to be suitable media.

However, the medium may be chosen to cause some slight swelling of the surface regions of the xerogel or replica structure if a deeper penetration of the reagent into the material (i.e. deeper modification of the material) is desired. This may provide for a more even modification of the surface, also. A suitable medium which causes slight swelling is N,N-dimethylacetamide.

The anhydride will typically be present in between 10 and 30%, e.g. about 20%, by volume with respect to the medium, and the base will typically be present in between 1 and 5%, e.g. about 2%, by volume with respect to the medium. A typical solution, then, could contain 100 parts (by volume) of toluene, 20 parts of acetic anhydride, and 2 parts of pyridine.

As described previously, the process of this invention comprises contacting a polymer lens or replica with any one of the aforesaid reagents for a sufficient period of time to effect the desired modification of the polymer. To carry out the process, the contact lens material is simply immersed and maintained in the selected reagent or a solution thereof at a temperature ranging generally from 0° to about 70° C. for a time period ranging from about 5 minutes to about 3 hours. It is to be understood, of course, that for any particular treatment the most satisfactory reaction time will generally be inversely proportional to the temperature, i.e. the time required to effect the treatment typically will be shorter as the reaction temperature is increased. Particularly satisfactory results are obtained employing reaction temperatures of 25°–50° C. for 20–60 minutes.

While not wishing to be bound by any particular theory, the treatment is presently believed to be effected by modification of the polymer material by esterification of the hydroxyl groups at or near the surface of the lens or replica by the reagent. Treatment by use of the reagent is also believed to facilitate removal of organic-type impurities (residual monomers and diluents, low molecular weight polymers, solvents used in edging and polishing such as silicone oils, contaminants from lens molds, etc.) from the lens. The reaction of the treating reagent with any water which may be present in the material improves penetration of cleaning solvents (typically hydrophobic) into the material, and thus enhances their effectiveness.

Upon completion of the treatment, the treated lens material is removed from the treating reagent, rinsed well with Freon or similar suitable cleaning agents, and is then treated much as an unmodified lens, i.e. boiled in water for 2 hours to hydrate it and remove any residual water-soluble materials present in the lens. The lens may then be soaked in a suitable medium, e.g. water or physiological saline solution for further leaching if desired.

The improved ability of the treated polymer to inhibit the diffusion of e.g. proteins and bacteria, compared to untreated lens materials, may be indicated by protein diffusion studies carried out by prolonged soaking of the lenses in simulated human tear solution or other suitable media.

By significantly inhibiting the transmission of opacifying and/or discoloring substances onto or into soft contact lens materials, the process of this invention provides lens products which are greatly improved over those presently available. The treated products of this invention remain clear, transparent, and optically beneficial to the wearer for a longer period of time than is possible with current lenses and, accordingly, need be cleaned and/or replaced less often.

For a fuller understanding of the nature and objects of this invention, the following specific examples are given. These examples are intended merely to illustrate the invention and are not to be construed in a limiting sense.

EXAMPLES

Example 1

Treating solutions were prepared having the following composition:

5.0 mL medium (as set forth in Table I below)
1.0 mL acetic anhydride
0.1 mL pyridine.

Crofilcon A molded lenses were dried (using a vacuum desicator), and were immersed in the treating solutions for 1 hour at 45° C., followed by 1 hour at ambient temperature (ca. 20° C.). The lenses were removed from the treating solution and rinsed off using TF Freon. The physical and optical properties of the lenses were then observed; the results were as set forth in Table I.

TABLE I

| Sample | Medium | Results |
| --- | --- | --- |
| IA | hexane | Two-phase system |
| IB* | toluene | Slightly twisted lens surface after hydration |
| IC | acetonitrile | Swollen lens, opaque after hydration |
| ID | methyl ethyl ketone | Slight swelling, crack noted on the hydrated surface |
| IE* | CCl₄ | Same as for IB |
| IF* | CHCl₃ | Same as for IB |
| IG* | benzene | Same as for IB |

*These systems were found to be the most promising.

EXAMPLE 2

Crofilcon A lenses were dried (using a vacuum desicator), and were immersed, under a variety of conditions, in solutions containing 5.0 mL medium, 1.0 mL reagent, 0.1 mL pyridine, as shown in Table II below.

TABLE II

| Sample | Time | Temp. | Medium | Reagent |
| --- | --- | --- | --- | --- |
| IIA | 20 min. | 45° C. | toluene | acetic anhydride |
| IIB | 50 min. | 45° C. | toluene | acetic anhydride |
| IIC | 20 min. | 45° C. | CCl₄ | acetic anhydride |
| IID | 50 min. | 45° C. | CCl₄ | acetic anhydride |
| IIE | 20 min. | 45° C. | toluene | trifluoroacetic anhydride |
| IIF | 30 min. | 0° C. | toluene | trifluoroacetic anhydride |

The lenses were removed from the treating solution and rinsed off using TF Freon. The physical and optical properties of the lenses were then observed. All of the lenses treated were physically and optically satisfactory.

Example 3

Lens samples IIA, IIB, IIC and IIF, were tested (together with a control lens, of crofilcon A, which was untreated) to determine the extent of protein deposition. Each of the lenses was immersed in a test solution containing lysozyme. The lenses were removed, rinsed off, and the deposited protein hydrolysed by placing each lens in a solution of p-toluenesulfonic acid at about 120° C. for about 24 hours. The lenses were removed from their respective hydrolysis tubes, and the pH of the remaining hydrolysates adjusted to about 3.5 using NaOH. The hydrolysates were analysed by HPLC (using an ion exchange column) for arginine content, using nor-leucine as an internal standard, calculating the protein deposition as a function of surface area. The results are reported in Table III.

TABLE III

| Sample | Average Deposition in ng/mm², Error |
| --- | --- |
| Control | 2200, 100 |
| IIA | 850, 100 |
| IIB | 400, 100 |
| IIC | 400, 60 |
| IIF | 1350, 300 |

It can be seen that the extent of protein deposition is dramatically reduced by treatment according to the present invention.

Example 4

Vacuum dried lenses made of crofilcon A were treated at ambient temperature for various times with a treating solution containing 5.0 mL toluene, 1.0 mL acetic anhydride, 0.1 mL pyridine. Following treatment, the lenses were cleaned and the extent of hydration was determined in the normal manner, i.e. by weighing the lenses in the hydrated and anhydrous state. Dry lens weights ranged from 14.24 to 15.41 mg/lens, while hydrated weights ranged from 25.93 to 27.83 mg/lens. The results are set out in Table IV.

TABLE IV

| Time | Percent Hydration (% S.D.) |
| --- | --- |
| 0 (control) | 44.1% (1.4) |
| 10 min | 44.7% (1.6) |
| 30 min | 44.5% (2.1) |

The results show that there is no significant difference in their extent of hydration between treated and untreated lenses.

Example 5

Crofilcon A lenses are immersed, under a variety of conditions, in solutions containing 5.0 mL medium, 1.0 mL reagent, 0.1 mL pyridine, as shown in Table V below.

TABLE V

| Sample | Time | Temp. | Medium | Reagent |
|---|---|---|---|---|
| VA | 20 min. | 45° C. | toluene | trimethylacetic anhydride |
| VB | 45 min. | 20° C. | toluene | trimethylacetic anhydride |

The lenses were removed from the treating solution and rinsed off using TF Freon. The physical and optical properties of the lenses were then observed. All of the lenses treated were physically and optically satisfactory.

Example 6

HEMA lenses were tested using the methods of Examples 2-4, and gave comparable results.

Example 7

Crofilcon A lenses were immersed for 20 minutes at 40° C. in a solution containing:
74.7 vol.% toluene
15.0 vol.% acetic anhydride
3.3 vol.% pyridine
7.0 vol.% N-methyl-2-pyrrolidone The lenses were removed from the treating solution and rinsed off using TF Freon. The physical and optical properties of the lenses were then observed. All of the lenses treated were physically and optically satisfactory.

Example 8

The procedure identified above in Example 5 was repeated, substituting N,N-dimethyl-4-aminopyridine for the pyridine.

Example 9

The procedure followed above in Example 5 is repeated, substituting N,N-dimethyl-4-aminopyridine (DMAP) or 4-pyrrolidylpyridine (PP) for pyridine, and propionic anhydride, n-butyric anhydride, or hexanoic anhydride for trimethylacetic anhydride. DMAP and PP both enhance the activity of the anhydrides.

As may be seen from the foregoing Examples, the treatment of this invention provides lenses which have dramatically lower protein deposition than untreated control lenses. These treated lenses also have improved mechanical properties such as tear strength and modulus, while their optical and physical properties remain substantially unaffected.

While the present invention has been described with reference to specific embodiments thereof, it should be understood by those skilled in the art that various changes may be made and equivalents may be substituted without departing from the true spirit and scope of the invention. All such modifications are intended to be within the scope of the claims appended hereto.

What is claimed is:

1. A process for increasing the resistance of a soft contact lens to the deposition thereon, and diffusion and accumulation therein, of substances which will promote its clouding and discoloration in use, said process comprising contacting, in an anhydrous medium, the xerogel form of a hydroxyl group-containing acrylic ester soft contact lens with an organic acid anhydride in which the organic (non-carboxyl) moiety is selected from the group consisting of C1-C8 alkyl (including cycloalkyl), halogen-substituted C1-C8 alkyl, or silyloxy-substituted C1-C8 alkyl, said anhydride being present in about 10 to 30% by volume with respect to said medium.

2. The process of claim 1 wherein the organic acid anhydride is acetic anhydride.

3. The process of claim 1 wherein the organic acid anhydride is trimethylacetic anhydride.

4. The process of claim 1 wherein the organic acid anhydride is trifluoroacetic anhydride.

5. The process of claim 1 which is conducted at a temperature between 0° and 70° C.

6. The process of claim 5 which is conducted at a temperature between 25° and 50° C.

7. The process of claim 1 wherein said process is carried out in the presence of a mild base.

8. The process of claim 7 wherein the mild base is selected from the group consisting of pyridine, trimethylamine, triethylamine, N,N-dimethyl-4-aminopyridine, and 4-pyrrolidylpyridine.

9. The process of claim 8 wherein the mild base is pyridine.

10. The process of claim 1 wherein the medium is selected from the group consisting of aliphatic and aromatic hydrocarbons and halogen-substituted hydrocarbons.

11. The process of claim 10 wherein the medium is toluene.

12. The process of claim 1 wherein the hydroxyl group-containing acrylic ester is selected from the group consisting of copolymers containing a major proportion of HEMA, GMA, and mixtures thereof.

13. A contact lens prepared according to the process of claim 1.

14. The process of claim 1 wherein the medium is one which causes slight swelling of the lens or replica.

15. The process of claim 14 wherein the medium comprises N,N-dimethylacetamide.

16. The process of claim 14 wherein the suitable medium comprises N-methyl-2-pyrrolidone.

* * * * *